United States Patent [19]
Di Leo

[11] 3,844,163
[45] Oct. 29, 1974

[54] ULTRASONIC VELOCITY METER

[75] Inventor: Christopher Di Leo, Brewster, N.Y.

[73] Assignee: Automation Industries, Inc., Los Angeles, Calif.

[22] Filed: Apr. 17, 1973

[21] Appl. No.: 351,812

[52] U.S. Cl............................................. 73/67.5 R
[51] Int. Cl........................... G01n 9/24, G01h 5/00
[58] Field of Search............... 73/67.5 R, 67.6, 67.7, 73/67.8 R

[56] References Cited
UNITED STATES PATENTS

| | | | |
|---|---|---|---|
| 3,003,351 | 10/1961 | Ziegler et al. | 73/67.5 R |
| 3,003,352 | 10/1961 | Ziegler et al. | 73/67.5 R |
| 3,554,014 | 1/1971 | Berg et al. | 73/67.8 R |
| 3,603,136 | 9/1971 | Diamond et al. | 73/67.8 R |
| 3,690,155 | 9/1972 | Eichler | 73/67.5 R |
| 3,774,444 | 11/1973 | Kent | 73/67.6 |

Primary Examiner—Donald O. Woodiel
Assistant Examiner—Stephen A. Kreitman
Attorney, Agent, or Firm—Dan R. Sadler

[57] ABSTRACT

An ultrasonic nondestructive testing system is described for measuring the veocity at which ultrasonic energy propagates through a material. The system is particularly adapted to be used on a material such as nodular cast iron for ascertaining the percentage nodularity. A pair of search units are provided for propagating ultrasonic energy toward the opposite sides of a workpiece and receiving such energy therefrom. In addition, means such as a computer are provided for measuring the various time delays resulting from the ultrasonic energy propagating through the workpiece and computing the velocity of the ultrasonic energy in the workpiece.

20 Claims, 5 Drawing Figures

ULTRASONIC VELOCITY METER

BACKGROUND

One common technique for nondestructively testing or inspecting materials is to transmit sonic or ultrasonic energy into the workpiece. The interreaction between the ultrasonic energy and the workpiece is observed and/or measured. By this means considerable information can be determined about the workpiece.

For example, any energy incident upon a discontinuity such as the external surfaces of the workpiece and/or a crack, etc., within the workpiece is at least partially reflected from the discontinuity.

In the through-transmission mode, ultrasonic energy is transmitted into the workpiece from one side thereof and received on the opposite side. If there is a discontinuity inside the workpiece, a substantial portion of the energy will fail to pass through the workpiece. Accordingly, failure to receive ultrasonic energy indicates an internal defect.

In the pulse-echo mode a burst or pulse of ultrasonic energy is transmitted into the workpiece. If there are any discontinuities with the workpiece echoes of the pulse will be reflected back and received.

Dimensional measurements are normally made by measuring the flight-time for the ultrasonic energy to traverse a path and/or to receive an echo, etc. By multiplying the flight-time and the velocity of the ultrasonic energy, the dimensions of the workpiece, the location of discontinuities, etc., can be computed.

The accuracy of any such dimensional measurements is a function of the accuracy of the value used for the velocity of propagation. Most materials such as steel, aluminium, etc., are very homogeneous structures and as a practical matter the velocity is substantially constant for all objects of that particular material. In other words, the velocity is essentially constant irrespective of the internal microstructure of the material. As a result where a series of similar workpieces consist of a material of this nature, the dimensions of the workpiece can be determined within an acceptable degree of accuracy by observing the flight-time required for the ultrasonic energy to propagate through the workpiece.

However, there are some materials where the propagation velocity for ultrasonic energy is not necessarily a constant. Instead, in this type of material the velocity may vary over a fairly substantial range depending upon the internal or microstructure of that particular sample. One notable and very important material of this nature is cast iron.

Figure 5:
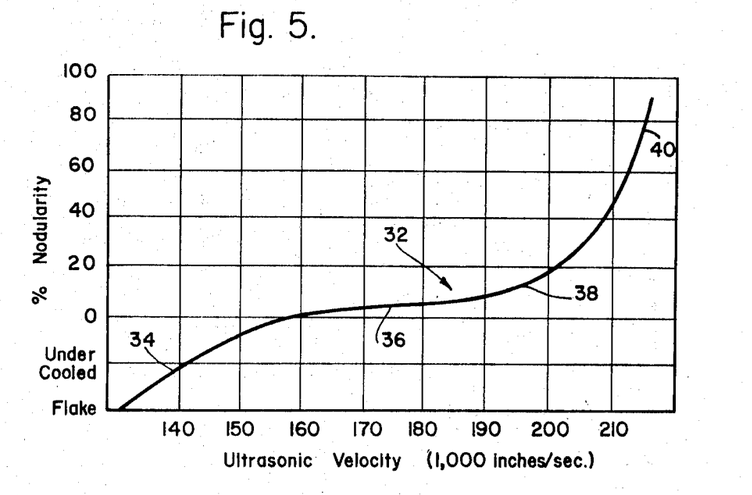
FIG. 5 is a graph representing the characteristics of the velocity of propagation for ultrasonic energy in a material such as cast iron and showing the correlation between such velocity and the nodularity of the material.

If the graphite in cast iron is in flake form (i.e., grey iron), the casting tends to be weak and brittle. However, if the graphite is in a spherical or nodular form (i.e., nodular iron) the casting tends to be strong and ductile. In addition to affecting the strength, ductility, etc., of the casting, the form of the graphite also materially affects the velocity of propagation for the ultrasonic energy. FIG. 5 includes a graph showing the variations in velocity as the nodularity varies.

If the graphite is in flake form the velocity is relatively low whereas if the graphite is in spherical or nodular form, the velocity is considerably higher. It will thus be seen that for certain types of materials, the microstructure and some properties of the materials can be determined by measuring the ultrasonic velocity in the material. However, in the case of cast iron, it has been found that as the nodularity varies over a range of approximately 40 percent to 80 percent, the ultrasonic velocity will vary approximately 1 percent or 2 percent. Accordingly, it is essential that the velocity be measured with an extreme degree of accuracy.

Numerous systems and arrangements have been proposed for measuring the ultrasonic velocity through materials such as cast iron. For example reference may be made to U.S. Pat. No. 3,603,136 entitled "Ultrasonic Measurement of Material Nodularity" filed in the names of Messrs Milton J. Diamond and Robert H. Lutch, and U.S. Pat. No. 3,690,155 entitled "Apparatus for Measuring Sound Velocity in a Workpiece" filed in the name of Richard H. Eichler. Systems of the foregoing variety do provide useful results for many purposes. However, it has been found that as a practical matter there are many difficulties in determining the velocity within the required degree of accuracy. This is particularly true where the system is required to operate under the adverse conditions in and around a production line.

One big problem has been the inability to measure the dimensions of the workpiece within an adequate degree of precision, particularly the dimensions of the path actually followed by the ultrasonic energy. This has been especially true where the surface of the workpiece is rough and irregular as in a typical casting. For example, the unmachined or "as cast" surface is usually rough and irregular, having many humps and bumps, etc. As a result, the dimensions from one surface of the casting to an opposite surface may vary over a substantial and unpredictable range. In fact, very frequently the errors in measuring the distance have been equal to or in excess of the variations which may be expected in the velocity of the ultrasonic energy.

Another problem has been eliminating the adverse effects of temperature variations upon the velocity. Under extreme conditions the change in velocity produced by a change in temperature may exceed that produced by the degree of nodularity.

In addition, it has been found that under the adverse operating conditions in and around a production line in a typical factory or foundry, the electronic equipment tends to be somewhat unstable and tends to "drift" over a very substantial range. This has, of course, materially affected the accuracy of the test and severely limited the utility of the system.

SUMMARY

The present invention provides means for overcoming the foregoing difficulties. More particularly, the present invention provides means for very precisely measuring the propagation velocity for ultrasonic energy within a workpiece. Among other things means are provided for very precisely determining the length of the path which is actually followed by the ultrasonic energy as it passes through the workpiece. In addition, means are provided for simultaneously very precisely measuring the flight-time required for the ultrasonic energy to traverse the path and to then indicate the velocity of propagation.

DESCRIPTION

Figure 1:
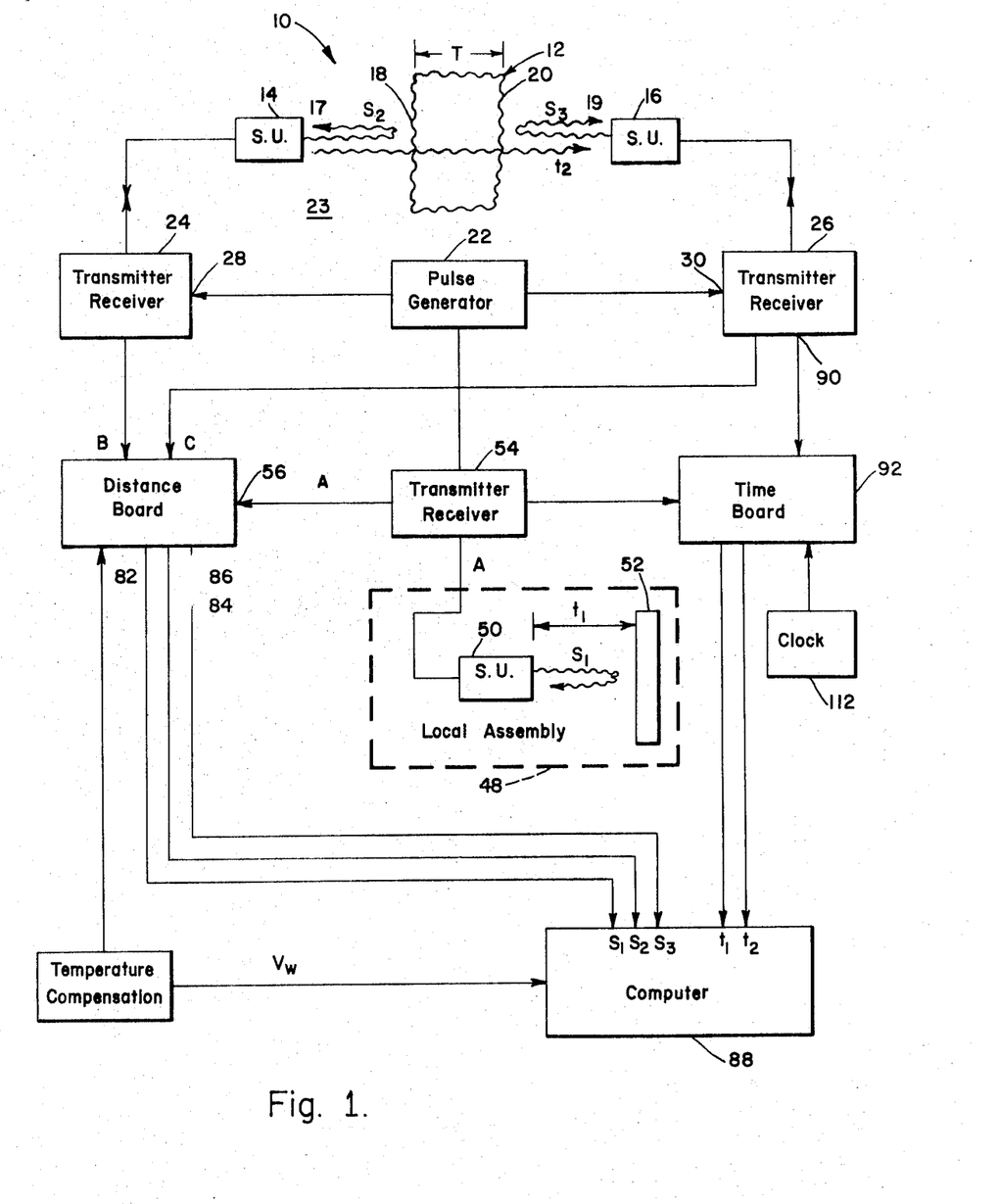
FIG. 1 is a block diagram of an ultrasonic nondestructive testing system embodying one form of the present invention.

Referring to the drawings in more detail and particularly to FIG. 1, the present invention is embodied in an ultrasonic nondestructive testing system 10 especially adapted to measure the velocity of propagation of ultrasonic energy through a workpiece or test specimen 12.

The system 10 may be used for measuring the velocity of ultrasonic energy through any type of workpiece and/or type of material. However, in the present instance it is illustrated and described as being used to measure the ultrasonic velocity through a workpiece 12 consisting of a material such as cast iron. Moreover, it is especially adapted to measure the ultrasonic velocity with a sufficiently high degree of accuracy to insure the accurate determination of the percentage of nodularity.

A pair of search units 14 and 16 for transmitting and/or receiving ultrasonic energy are adapted to be disposed on the opposite sides of the workpiece 12. The frequency of the ultrasonic energy is not believed to be particularly critical and may be within a wide range. By way of example, the frequency may be in a range of approximately 5 to 10 megacycles/sec. At these frequencies, the energy is very severly attenuated in air. Accordingly, it is highly desirable for the search units 14 and 16 and the workpiece 12 to be submerged in an acoustical couplant such as water.

Normally the two search units 14 and 16 are axially aligned with each other whereby the ultrasonic energy radiated from one search unit 14 will propagate along a straight line to the other search unit 16. In addition, the two search units 14 and 16 are positioned so that the ultrasonic energy will be incident upon the opposite surfaces 18 and 20 of the workpiece 12 at substantially right angles to the surfaces 18 and 20.

A clock or pulse generator 22 is provided for generating a series of repetitively occurring clock or timing pulses. These pulses are effective to determine the repetition rate at which the entire system 10 operates. The repetition rate is not believed to be particularly critical and may vary over a wide range. However, by way of example, it may be in the region of approximately 1 kilocycle per second.

A pair of combination transmitter/receivers 24 and 26 are coupled to the two search units 14 and 16 and to the outputs of the pulse generator 22. The transmitter portions of the transmitter/receivers 24 and 26 are responsive to the clock pulses from the pulse generator 22 whereby they operate synchronously with each other.

Each time a clock pulse occurs at the input 28 or 30 to a transmitter portion it produces a pulse suitable for driving the associated search unit 14 or 16. This driving pulse is normally a high-voltage pulse having a frequency corresponding to the frequency of the ultrasonic energy which is to be radiated by the search unit. As indicated above, this frequency is not believed to be particularly critical and may be in a range of approximately 5 to 10 megacycles per second.

The pulses of ultrasonic energy radiated by the search units 14 and 16 are preferably short. However, they normally persist for a short period of time and may include a limited number of cycles, for example 5 to 10 cycles or even somewhat more. As indicated above, the actuation of the two transmitters 24 and 26 and the search units 14 and 16 are synchronized with each other by the pulse generator 22. However, the energizing of one search unit is preferably delayed from the energizing of the other search unit. This insures any ultrasonic energy transmitted from the first search unit being fully dissipated before the second search unit transmits a succeeding pulse.

Each time a driving pulse from one of the transmitters 24 or 26 is applied to the associated search units 14 or 16, a burst or pulse of ultrasonic energy is transmitted from that search unit through the water 23 toward the workpiece. When the energy is incident upon a surface 18 or 20 of the workpiece 12, a portion of the energy is reflected from the surface as an echo. The remainder passes through the surface and into the workpiece 12. The energy then propagates through the workpiece and is incident upon the opposite surface of the workpiece. A portion of the energy on this surface is reflected back toward the search unit while a portion passes through the surface and into the water and propagates to the search unit.

As a consequence, each time a search unit 14 or 16 transmits a pulse of ultrasonic energy, it will receive an echo from the near surface 18 or 20 of the workpiece 12 and an echo from the far surface of the workpiece. The opposite search unit will receive a pulse of the energy which has traversed across the space between the two search units.

Each of the search units, of course, produces electrical signals corresponding to the energy incident thereon. Thus, whenever one of the search units transmits a pulse, it will generate a signal having at least two pulses. The first pulse is delayed by a time interval corresponding to the transit time along path 17 or 19, i.e., the round trip flight-time required for the ultrasonic energy to be returned from the front surface 18 or 20 of the workpiece. The second pulse is delayed by a time interval corresponding to a path to the backside of the workpiece; i.e., the round trip flight-time required for the echo to return from the back surface of the workpiece.

The second search unit 16 receives a part of the energy which was transmitted by the first search unit 14 and has propagated across the space between the unit. This second unit 16 then produces a pulse which is delayed from the transmission of the ultrasonic energy by an interval corresponding to the flight-time required for the ultrasonic energy to propagate from one search unit to the other. This flight-time is, of course, a function of the distance between the two search units and the velocity of propagation.

If the space between the two search units 14 and 16 is only water, the flight-time will be equal to the distance between the search units divided by the velocity of sound through the water. This velocity is essentially uniform over this distance. Although the velocity is a function of several characteristics of the water such as its temperature, etc., it is a readily ascertainable factor.

If the workpiece 12 is between the search units 14 and 16, the flight-time will be the sum of two transit times, i.e., the transit time through the remaining water couplant path on the opposite sides of the workpiece and the transit time through the workpiece 12. As indicated above, the velocity through the water is known or at least readily ascertainable. However, as may be seen from the graph in FIG. 5, the propagation velocity through the workpiece is a variable quantity and dependent upon the condition of the workpiece. In fact, determining this velocity is the object of the test. In addition, since the workpiece is usually a casting having fairly rough and irregular surfaces, its dimensions are also not readily known.

The variations in the velocity of ultrasonic energy through a material such as cast iron are illustrated by the graph 32 in FIG. 5. It may be seen from this graph the velocity of ultrasonic energy is dependent upon the internal or microstructure of the material and in particular the character or condition of the graphite in the iron.

In a typical grey iron casting the graphite is normally in a flaked condition and the ultrasonic velocity is in a range having an upper limit of about 150,000 inches per second. This portion 34 of the curve 32 has a relatively small slope. When the cast iron is in a so-called undercooled condition or even in a slightly nodular condition, the velocity will be in the range of from about 160,000 to about 195,000 inches per second. As a consequence this portion 36 of the curve is very flat and forms a sort of plateau.

However, a very pronounced knee 38 is present in the curve 32 in the region where the velocity is about 195,000 to 200,000 inches per second and the nodularity is about 5 percent to 15 percent. The portion 40 of the curve beyond the knee 38 (i.e., the nodularity is in excess of above 20 percent) is very steep and has a large slope. For example as the nodularity varies from about 20 percent up to about 90 percent, the velocity varies in a range extending from a little above 200,000 inches per second and up to almost 215,000 inches per second.

Because of the large slope above the knee 38 of the curve 32, relatively large changes in the percentage of nodularity cause relatively small changes in the velocity. In the range between 20 percent nodularity and 90 percent nodularity, the velocity only changes over a range of about 10,000 to 15,000 inches/second. In other words, as the nodularity varies over a range of 70 percent, the velocity only varies about 5 percent to 7 percent.

It will thus be seen that it is relatively easy to distinguish between grey cast iron and a high percentage nodular iron by measuring the ultrasonic velocity. However, it has been relatively difficult to distinguish between even relatively large changes in the percentage nodularity by this means. More particularly, in order to resolve the percentage of nodularity it is necessary to measure the velocity with an extremely high degree of precision. To resolve the difference between 60 percent and 80 percent nodularity the velocity must be measured within 1 percent or less.

The receiver portion of each of the receiver/ transmitters 24 and 26 is effective to receive or detect the electrical signals produced by their respective search units 14 and 16. As indicated above, the signal produced by each search unit included a series of pulses. The pulses are delayed from the driving signal from the pulse generator 22. The lengths of the delays correspond to the times at which the ultrasonic energy is received as described above.

Each of the receivers 24 and 26 is particularly adapted to be responsive to the signal corresponding to the echo from the front or near side of the workpiece. Since there are usually a large number of pulses in the signal it is normally desirable to provide a gate or some similar type device for suppressing or separating out all of extraneous pulses.

Each receiver 24 and 26 includes means for producing a signal corresponding to the time at which the echo from the front surface of the workpiece 12 is received. By way of example, in the present instance, this includes a square wave generator such as a monostable multivibrator.

When the clock pulse from the pulse generator 22 triggers the transmitter portion, the square wave generator simultaneously switches from the low state to a high state. It remains in the high state until the occurrence of the received pulse, i.e., the pulse corresponding to the echo from the front surface of the workpiece. When the front interface echo pulse is received the square wave generator instantly switches back to the low state as may be seen in FIG. 3.

Figure 3:
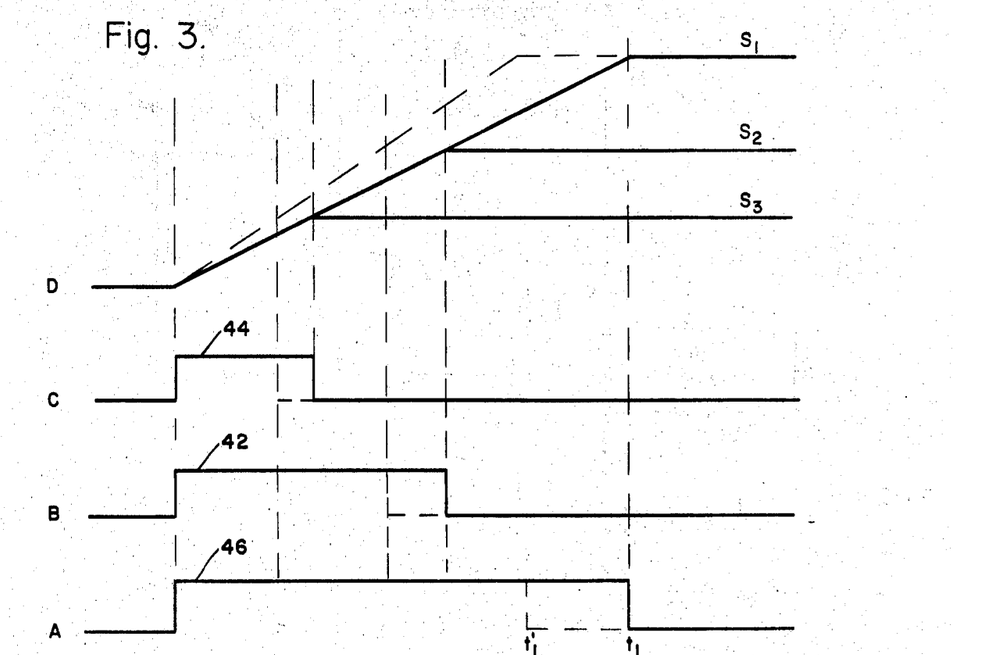
FIG. 3 is a graph of certain operating conditions within the block diagram of FIG. 2.

This results in a pair of square waves 42 and 44 each of which has a time duration equal to the flight-time required to receive the echoes from the corresponding front surface. This is of course the same as the time required for the energy to make a round trip from the search unit, through the liquid couplant to the front surface and then back through the liquid couplant to the search unit.

The second transmitter/receiver 26 includes a gate or other means responsive to the portion of the received signal resulting from the pulse of ultrasonic energy traveling from the first search unit 14 to the other search unit 16. This results in a square wave signal 46 having a duration equal to this transit time.

The velocity at which the ultrasonic energy propagates through the liquid couplant is known or at least it can be readily determined. Accordingly, by multiplying the time durations of the square wave pulses 42 and 44 by the velocity of propagation through the water, the lengths of the two water paths 17 and 19 between the search units 14 and 16 and the adjacent faces 18 and 20 of the workpiece 12 may be readily determined. By then subtracting the sum of the lengths of these two water paths 17 and 19 from the total distance between the two search units 14 and 16 the thickness T of the workpiece 12 can be determined.

Although it may appear to be a simple matter to determine the thickness T of the workpiece 12 by this technique, as a practical matter it is difficult to do so on a production basis with the required degree of accuracy. (As indicated by the graph in FIG. 5 the velocity must be very accurately measured if the percentage nodularity is to be accurately resolved). First of all it is necessary for the distance between the two search units to be accurately known and/or at least precisely set at a fixed reference standard. Secondly, it is necessary for the signals representing the time delays to be very accurately determined.

In order to produce a standardized or reference distance, a local assembly 48 is provided. The local assembly 48 includes a search unit 50 and a reflector plate 52 which are submerged in the liquid couplant. These are preferably close to the other search units 14 and 16 whereby they are in the same environment. The search unit 50 is generally similar to the two preceding search units 14 and 16. It is adapted to transmit a beam of ultrasonic energy toward the reflector plate 52. The reflector plate 52 is disposed at right angles to the beam whereby any pulses of ultrasonic energy transmitted by the search unit 50 are reflected back to the search unit 50.

The spacing between the search unit 50 is normally selected to form a standardized reference length $S_1$. This corresponds to the total length of the space between the two search units 14 and 16. It should be noted that since this search unit 50 operates in a pulse echo mode the actual distance between the search unit 50 and the reflector 52 is approximately one-half the distance between the two search units 14 and 16.

The search unit 50 is coupled to a transmitter/receiver 54 similar to the other transmitter/receivers 24 and 26. The receiver portion is effective to produce a signal which is a function of the round trip distance from the search unit 50 to the reflector 52.

The two search units 14 and 16 are adjusted (while the space therebetween is only water) until the spacing therebetween produces a through transmission signal which is equal to the signal from the receiver 54. It can be appreciated that if the two search units 14 and 16 are adjusted axially until the signal resulting from a through transmission is equal to the signal from the search unit 50, the signal from the search unit 50 will provide an accurate standardized reference signal representing the distance between the two search units 14 and 16.

Figure 2:
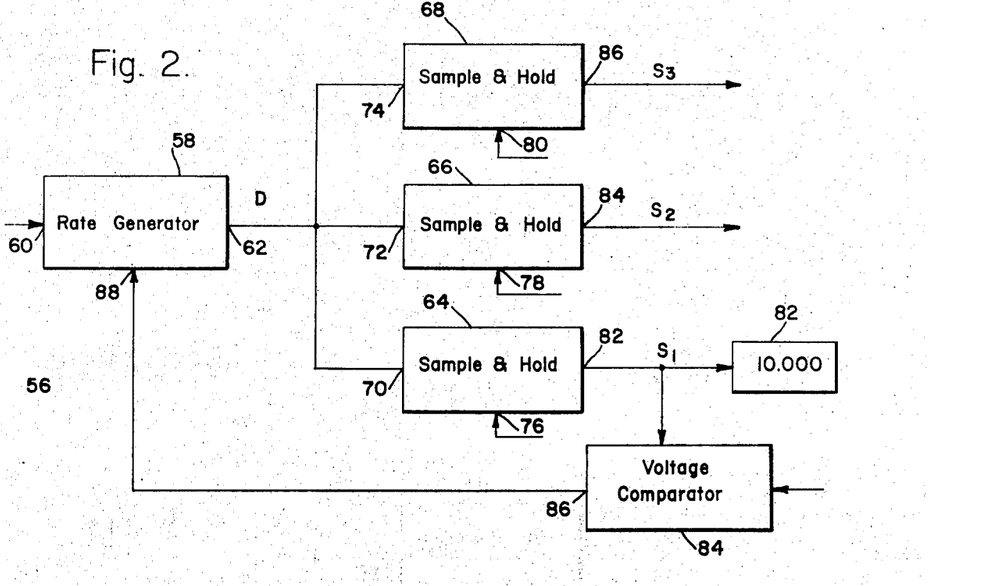
FIG. 2 is a block diagram of one portion of the system of FIG. 1.

In order to provide signals which accurately represent the time delays and the distances which cause these delays, a distance board 56 is coupled to the outputs of the three transmitter/receivers 24, 26 and 54. This distance board 56 which is best seen in FIG. 2 is effective to produce distance signals with a high degree of accuracy.

The distance board 56 includes a rate generator 58 which is effective to generate a very precisely controlled voltage. The rate generator 58 has an input 60 that is coupled to the pulse generator 22 whereby it is triggered in synchronism with the driving pulses coupled to the search units 14, 16 and 50.

The voltage on the output 62 of the rate generator 58 is normally at ground level prior to the occurrence of the clock pulse from the pulse generator 22. Each time the driving pulse occurs the voltage on the output 62 proceeds to rise at a very linear rate up to some predetermined maximum level. The voltage on the output 62 remains at this elevated level for a short period of time and then returns to the ground level before the next cock pulse occurs.

Three separate but substantially identical sample and hold circuits 64, 66 and 68 are provided. The signal inputs 70, 72 and 74 are all coupled to the output 62 of the rate generator 58 whereby they each receive the same signal. Each sample and hold circuit 64, 66 and 68 includes a control input 76, 78 and 80. A signal applied to the control input is effective to determine the time when the signal on the signal input is sampled.

When such a sample is taken, the output 82, 84 and 86 is retained at the level of the input 70, 72 and 74 when the sample signal occurs.

The first sample or control input 76 is coupled to the transmitter-receiver 54 for the local assembly 48. When the square wave 46 from the local assembly 48 terminates, the first sample and hold circuit 64 will sample the voltage from the rate generator 58. The spacing of the search unit 50 from the reflector 52 is equal to one-half of the reference or standardized distance. Accordingly, the termination of this square wave 46 is a standardized reference signal corresponding to the standardized distance. Therefore, the voltage from this sample and hold circuit 64 should be equal to a standard level.

Preferably a digital voltmeter 82 is coupled to the output of this sample and hold circuit 64 for indicating the magnitude of the signal. Normally this signal is set at some predetermined maximum amount. By way of example, it has been found that a voltage of 10.000 volts is suitable.

It can be appreciated that some variations may occur in the various parts of the system 10 such as the rise time of the rate generator 58, etc., whereby the system 10 will drift. In order to prevent such problems, a voltage comparator 84 may be coupled to the output of the sample and hold circuit 64 and to a standardized reference such as 10.00 volts. This is effective to compare the output voltage from the sample and hold circuit 64 with the reference voltage and produce an error voltage. The magnitude of this error voltage indicates the difference, if any, between the voltage from the sample and hold circuit 64 and the reference voltage.

The output 86 of the voltage comparator is coupled to the control input 88 of the rate generator 58. Accordingly, the error voltage is effective to control the rate at which the voltage rises. In the event there are any variations in the voltage level, the error signal will automatically adjust the rate generator 58 so as to ensure the output 62 being maintained at exactly 10.000 volts.

The control input 78 for the second sample and hold circuit 66 is coupled to the output of the first transmitter-receiver 24 whereby it receives the first square wave 42 representing the distance between the first search unit 14 and the surface 18 of the workpiece 12.

The control input 80 for the third sample and hold circuit 68 is coupled to the second transmitter-receiver 26 whereby it receives the second square wave 44 representing the distance between the second search unit 16 and the workpiece 12.

Each time one of these square waves 42 or 44 terminate, the corresponding sample and hold circuit 66 or 68 samples the rising voltage from the rate generator 58. The voltages at the instant of the sampling are retained on the outputs 84 and 86.

The slope of the voltage, (i.e., the rate at which it increases) from the rate generator 58 is very carefully and precisely controlled. It is made as linear as possible. In addition, the peak level is locked at a level of exactly 10,000 volts. As a consequence, the two voltages from the sample and hold circuits will be very precisely proportional to the distance between the two search units 14 and 16 and the respective sides 18 and 20 of the workpiece; i.e., the lengths of the paths 17 and 19.

The outputs 82, 84 and 86 (i.e., the three outputs of the sample and hold circuits) of the distance board 56 are coupled to a computer 88. As a consequence, all three of the distance signals are fed into the computer 88.

It can be appreciated that by subtracting the sum of the two distance signals from the total or standard distance, the differences will be equal to the thickness T of the workpiece 12. Because of the standardizing of the distance signal from the local assembly 48 and the very carefully controlled and stabilized operating conditions of the distance board 56, this thickness signal will be extremely accurate.

Figure 4:
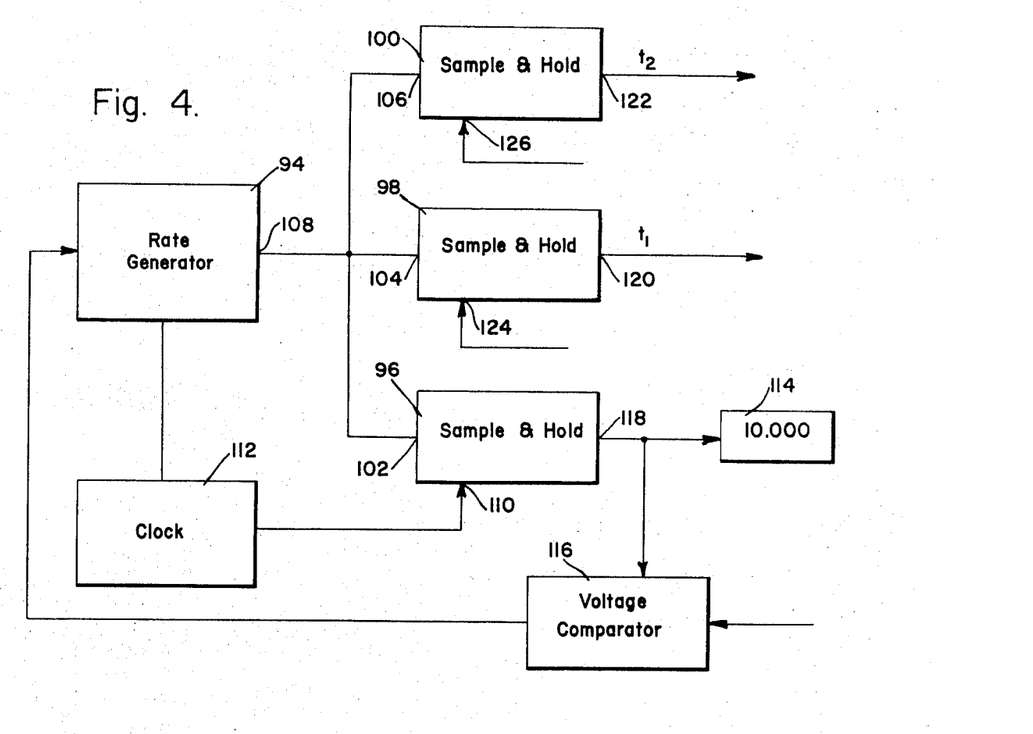
FIG. 4 is a block diagram of another portion of the system of FIG. 1.

In order to obtain the transit time required for the energy to travel through the workpiece, the output 90 of the transmitter-receiver 26 is coupled to a time board 92. The time board 92 (which is best seen in FIG. 4) is very similar to the distance board 56. The time board 92 includes a rate generator 94 and three sample and hold circuits 96, 98 and 100. The rate generator and sample and hold circuits may be virtually identical to those in the distance board.

All three of the sample and hold circuits 96, 98 and 100 have their signal inputs 102, 104 and 106 coupled to the output 108 of the rate generator 94. As a consequence, they are effective to sample the output voltage from the rate generator.

The control input 110 of one sample and hold circuit 96 is coupled to a clock 112. This clock 112 is effective to produce a time interval corresponding to the time delay produced from the local assembly 48 when the search unit 50 is correctly spaced from the reflector 52. This is also the same time interval for the pulse of ultrasonic energy to travel from one search unit 14 to the other search unit 16 when they are separated from each othe by the standard distance and the space is filled with only water.

When the clock pulse occurs, the sample and hold circuit 96 will sample the output of the rate generator 94 and maintain that voltage on the output. This signal is maintained at some predetermined fixed level such as 10,000 volts. A digital voltmeter 114 may be provided for indicating this voltage.

In addition, a voltage comparator 116 may be coupled to the output 118 of the sample and hold circuit 96 and to a reference voltage to generate an error signal. The error signal is coupled to the rate generator 94 so as to regulate and control the rising time of the generator whereby it will always be maintained at the 10,000 volts level.

The control input 124 for the first sample and hold circuit 98 is coupled to the transmitter/receiver 54 for the search unit 50 in the local assembly 48. Accordingly, it receives the signal representing the round trip distance from the search unit 50 to the reflector 52 and back. This is of course the standard reference signal which remains constant and is equal to the time required for a pulse to travel from one search unit 14 to the other search unit 16 when they are separated only by water.

The control input 126 for the third sample and hold circuit 100 is coupled to the output 108 of the receiver 26. Accordingly, when the search unit 16 receives a pulse of energy that has traveled across the space, the sample and hold circuit 100 will sample the rising voltage and produce a corresponding signal.

If the space is only water the signal will be equal to the signal created by the local assembly 48. However, if there is a workpiece 12 in position between the two search units 14 and 16, the time will be altered by the change of velocity through the workpiece 12. The outputs 120 and 122 of the time board 92 are coupled to the computer 88 so as to supply the two precisely controlled time signals thereto.

The computer 88 is effective to operate on all the time and distance signals so as to divide the distance by the transit time to indicate the velocity of propagation through the workpiece.

I claim:

1. The combination of:
    a pair of ultrasonic search units for transmitting ultrasonic energy into a workpiece, said pair of ultrasonic search units being effective to receive said energy from said workpiece and to produce signals corresponding thereto,
    a third ulstrasonic search ubit for transmitting pulses of ultrasonic energy toward a reflector and receiving echoes of said pulses from said reflector, said reflector being separated from said third search unit by approximately a predetermined distance whereby said echo is delayed by a standard reference time,
    receiving means coupled to said ultrasonic units and effective to produce signals corresponding to the ultrasonic energy passing through the opposite sides of said workpiece,
    distance means responsive to said receiving means and effective to produce a pair of signals each corresponding to the distance between one of said pair of search units and the associated adjacent side of said workpiece, said distance means being further coupled to said third search unit for generating a signal corresponding to said predetermined distance,
    timing means responsive to said receiving means and effective to produce a signal corresponding to the time required for said ultrasonic energy to be transmitted between said pair of ultrasonic search units with said workpice positioned therebetween, said timing means being further coupled to said third search unit for generating a signal corresponding to said standard reference time, and
    means responsive to said distance means and said timing means for producing a velocity signal indicative of the velocity of propagation through said workpiece.

2. The system as described in claim 1 and wherein said means responsive to said distance means and said timing means is a computer responsive to said distance means for generating a thickness signal corresponding to the thickness of said workpiece, said computer being further responsive to said timing means for generating a time signal corresponding to the time required to traverse the workpiece, said computer being further effective to divide said thickness signal by said time signal to produce said signal indicative of the velocity of propagation through said workpiece.

3. The combination of:
    a pair of ultrasonic search units for transmitting and receiving ultrasonic energy,
    a third ultrasonic search unit for transmitting and receiving ultrasonic energy over a predetermined distance to produce a standard reference signal, means for retaining said pair of search units axially aligned and separated from each other by a predetermined standard distance whereby the time required for a pulse of ultrasonic energy to propagate from one serch unit to the other search unit is equal to the time duration of said standard reference signal, means for positioning a workpiece between said pair of search units whereby at least one of said search units transmits pulses of ultrasonic energy along its axis through asid workpiece to the other of said search units whereby the time required for said pulses to traverse said distance is altered by its passage through said workpiece, said pair of search units being effective to receive echoes of said pulses of ultrasonic energy from the adjacent sides of the workpiece, the reception of said echoes being delayed by times corresponding to the distances between each of said pair of search units and the associated adjacent side of the workpiece, receiving means coupled to said pair of search units for producing a pair of signals each corresponding to one of said echo pulses of ultrasonic energy reflected from opposite sides of said workpiece, first means responsive to said receiving means and said third search unit for generating a pair of signals each corresponding to the distance between one of said pair of search units and the associated adjacent side of the workpiece, said first means being further effective to generate a signal corresponding to said predetermined standard distance, second means responsive to said receiving means and said third search unit for generating a signal corresponding to the time duration of transmission of ultrasonic signals between said pair of ultrasonic search units as altered by the presence between said pair of search units of said workpiece, said second means being further effective to generate a standard time signal corresponding to the time duration of said standard reference signal, and means responsive to said first and second means to produce a signal indicative of the velocity of propagation through said workpiece.

4. The system as described in claim 3 and wherein said means responsive to said first and second means is a computer responsive to said first means for generating a thickness signal corresponding to the thickness of said workpiece, and further responsive to said second means for generating a time signal corresponding to the time required to traverse the workpiece, said computer being effective to divide such thickness signal by said time signal to produce said signal indicative of the velocity of propagation through said workpiece.

5. The system as described in claim 3 and wherein said first means comprises:

voltage means for generating a linearly increasing voltage, a pair of sample and hold circuits each coupled to said voltage means and having an input coupled to said receiving means and each being effective to generate one of said of pair of said signals each corresponding to the distance between each of said pair of search units and the associated adjacent side of the workpiece, and a third sample and hold circuit coupled to said voltage means and being effective to generate said signal corresponding to said predetermined standard distance.

6. The system as described in claim 5 and wherein said voltage means comprises a rate generator and further comprising:

a voltage comparator coupled between the output of said third sample and hold circuit and said rate generator for generating an error signal coupled to said rate generator for correcting any erroneous variation in the output of said voltage means.

7. The system as described in claim 3 and wherein said second means comprises:

voltage means for generating a linearly increasing voltage, a sample and hold circuit responsive to at least one of said search units and said voltage means for generating a signal corresponding to the time duration of transmission of ultrasonic signals between said pair of ultrasonic search units as altered by the presence between said pair of search units of said workpiece, and a second sample and hold circuit responsive to said third search unit and said voltage means for generating a signal corresponding to said standard time.

8. The system as described in claim 7 and wherein said voltage means comprises a rate generator and further comprising:

a third sample and hold circuit responsive to said voltage means, a voltage comparator coupled to the output of said third sample and hold circuit and having an output coupled to the input of said voltage means, whereby said comparator generates an error signal which is coupled to said voltage means to regulate and control said voltage means.

9. The combination of:

a pair of ultrasonic search units for transmitting and receiving ultrasonic energy, a third ultrasonic search unit for transmitting pulses of ultrasonic energy toward a reflector and receiving echoes of said pulses from said reflector, said reflector being separated from said third search unit by approximately a predetermined distance whereby said echo is delayed by a standard reference time, means for retaining the search units in said pair axially aligned with each other and separate by said predetermined distance whereby the time required for a pulse of ultrasonic energy to propagate from one search unit to the other search unit is equal to said standard reference time, means for positioning a workpiece between said pair of search units whereby each of said search units transmits pulses of ultrasonic energy toward said workpiece and receives echoes of said pulses of ultrasonic energy from the associated adjacent sides of the workpiece, first means coupled to one of said pair of search units for producing a pair of signals each corresponding to the distances between one of said pair of search units and the associated adjacent side of the workpiece, said first means being further coupled to said third search unit for generating a signal corresponding to said predetermined distance, second means coupled to the other of said pair of search units and effective to produce a signal corresponding to the time required for transmission of ultrasonic energy from one search unit through the workpiece to the other search unit, said second means being further coupled to said third search unit for generating a signal corresponding to said standard reference time, and means responsive to said first and second means for producing a velocity signal indicative of the velocity of propagation through said workpiece.

10. The system as described in claim 9 and wherein said means responsive to said first and second means is a computer responsive to said first means for generating a thickness signal corresponding to the thickness of said workpiece, and further responsive to said second means for generating a time signal corresponding to the time required to traverse the workpiece, said computer being effective to divide said thickness signal by said time signal to produce said velocity signal.

11. The system as described in claim 10 and wherein said first means includes:

voltage means for generating a linearly increasing voltage, a pair of sample and hold circuits each coupled to said voltage means and each having an input coupled to one of said pair of ultrasonic search units, and each being effective to generate one of said pair of signals each corresponding to the distance between the associated search unit and the respective side of the workpiece, and a third sample and hold circuit coupled to said voltage means and being effective to generate said signal corresponding to said predetermined distance.

12. The system as described in claim 11 and further comprising a source of repetitively occuring timing pulses coupled to said pair of search units and said first means for synchronizing the operation thereof.

13. The system as described in claim 11 and wherein said second means comprises:

voltage means for generating a linearly increasing voltage, a sample and hold circuit responsive to at least one of said search units and said voltage means for generating a signal corresponding to the time duration of transmission of ultrasonic signals between said pair of ultrasonic search units as altered by the presence between said pair of search units of said workpiece, and a second sample and hold circuit responsive to said third search unit and said voltage means for generating a signal corresponding to said standard reference time.

14. This system as described in claim 13 and further comprising a source of repetitively occurring timing pulses coupled to said first and second means for synchronizing the operation thereof.

15. An ultrasonic testing system for measuring the velocity at which ultrasonic energy propagates through a workpiece comprising:

a pair of ultrasonic search units for transmitting and receiving ultrasonic energy, a third ultrasonic search unit for transmitting and receiving ultrasonic energy over a predetermined distance to produce a standard reference signal, means for retaining said pair of search units axially aligned on opposite sides of said workpiece and separated from each other by a predetermined standard distance whereby the time required for a pulse of ultrasonic energy to propagate from one search unit to the other search unit is equal to the time duration of said standard reference signal, first means responsive to said pair of search units for producing a pair of signals each corresponding to the distance between one of said pair of said search units and the associated adjacent side of the workpiece, and being further responsive to said third search unit to generate a signal corresponding to said predetermined standard distance comprising, voltage means for generating a linearly increasing voltage, a pair of sample and hold circuits each coupled to said voltage means and having an input operatively coupled to one of said search units and each being effective to generate one of said pair of signals each corresponding to the distance between one of said pair of search units and the associated adjacent side of the workpiece, and a third sample and hold circuit coupled to said voltage means and said third search unit and being effective to generate said signal corresponding to said predetermined standard distance, second means responsive to said receiving means and said third search unit for generating a signal corresponding to the time duration of transmission of ultrasonic signals between said pair of ultrasonic search units as altered by the presence between said pair of search units of said workpiece, said second meand being further effective to generate a signal corresponding to the time duration of said standard reference signal, and means responsive to said first and second means to produce a signal indicative of the velocity of propagation through said workpiece.

16. The system as described in claim 15 and wherein said voltage means comprises a rate generator and further comprising:

a voltage comparator coupled between the output of said third sample and hold circuit and said rate generator for generating an error signal coupled to said rate generator for correcting any erroneous variations in the output of said voltage means.

17. The system as described in claim 16 and further comprising a source of repetitively occurring timing pulses coupled to said pair of search units and said first and second means for synchronizing the operation thereof.

18. An ultrasonic testing system for measuring the velocity at which ultrasonic energy propagates through a workpiece comprising:

a pair of ultrasonic search units for transmitting and receiving ultrasonic energy, a third ultrasonic search unit for transmitting and receiving ultrasonic energy over a predetermined distance to produce a standard reference signal, means for retaining said pair of search units axially aligned on opposite sides of said workpiece and separated from each other by a predetermined standard distance whereby the time required for a pulse of ultrasonic energy to propagate from one search unit to the other search unit is equal to the time duration of said standard reference signal, first means responsive to said pair of search units for producing a pair of signals each corresponding to the distance between one of said pair of search units and the associated adjacent side of the workpiece, and being further effective to generate a signal corresponding to said predetermined standard distance, second means responsive to said pair of search units for generating a signal corresponding to the time duration of transmission of ultrasonic signals between said pair of ultrasonic search units as altered by the presence between said pair of search units of said workpiece, said second means being further effective to generate a signal corresponding to the time duration of said standard reference signal comprising;

voltage means for generating a linearly increasing voltage, a sample and hold circuit responsive to at least one of said search units and said voltage means for generating a signal corresponding to the time duration of transmission of ultrasonic signals between said pair of ultrasonic search units as altered by the presence between said pair of search units of said workpiece, and a second sample and hold circuit responsive to said third search unit and said voltage means for generating a signal corresponding to the time duration of said standard reference signal, and means responsive to said first and second means to produce a signal indicative of the velocity of propagation through said workpiece.

19. The system as described in claim 18 and wherein said voltage means comprises a rate generator and further comprising a third sample and hold circuit, and a voltage comparator coupled between the output of said third sample and hold circuit and said rate generator for generating an error signal coupled to said rate generator for correcting any erroneous variation in the output of said voltage means.

20. The system as described in claim 19 and further comprising a source of repetitively occurring timing pulses coupled to said pair of search units and said first and second means for synchronizing the operation thereof.

* * * * *